Oct. 2, 1956  H. J. LONG  2,764,778
POULTRY SHACKLE
Filed May 1, 1953
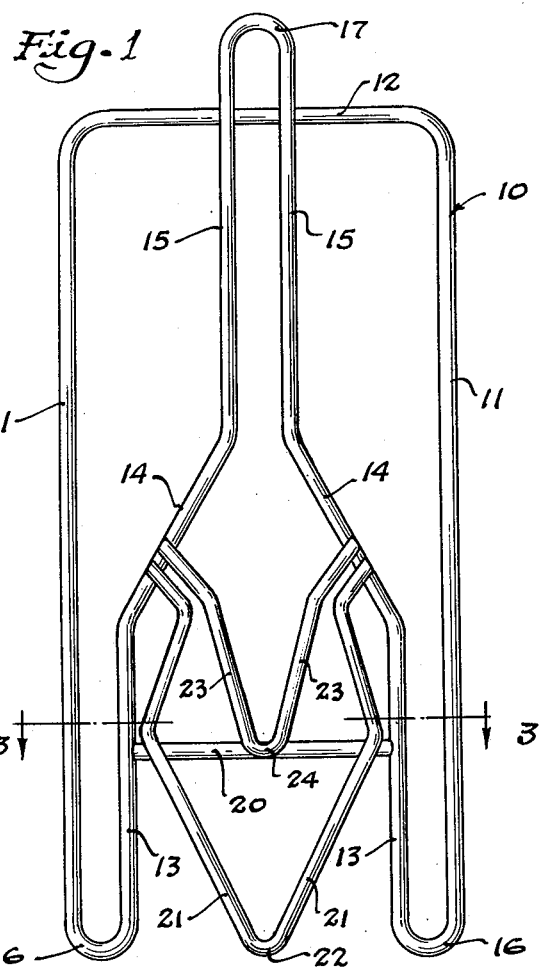
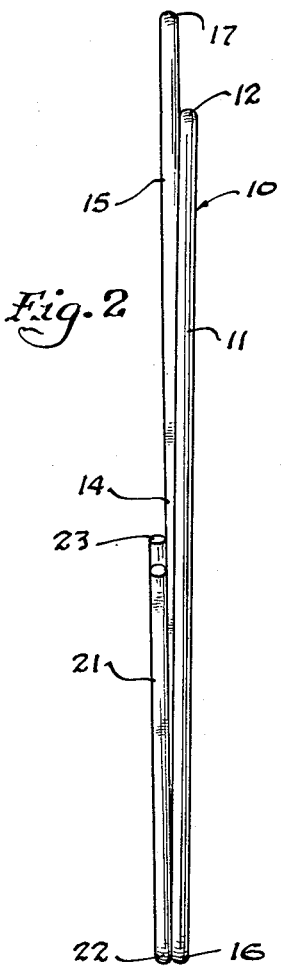
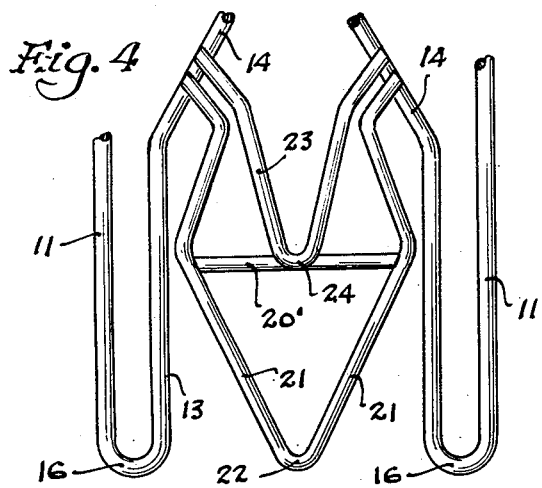
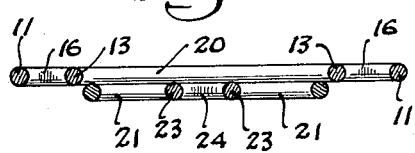
INVENTOR.
Harry J. Long
BY
R. J. Story
ATTORNEY 2,764,778
Patented Oct. 2, 1956

United States Patent Office

2,764,778
POULTRY SHACKLE

Harry J. Long, Chicago, Ill., assignor to Swift & Company, Chicago, Ill., a corporation of Illinois Application May 1, 1953, Serial No. 352,474

2 Claims. (Cl. 17—44.1)

This invention in general relates to a poultry shackle adapted to suspend a fowl in different positions during the slaughtering and processing thereof.

In commercial practice, processing involves several steps, some of which necessitate a different position of the bird from the position of other steps. For example, the fowl may be killed, scalded, and partially picked while hanging from its feet in a vertical position from a shackle. A position substantially inverted from the first position is advantageous in picking the back, the neck area, and between the legs during the dressing operation. A third position, one in which the fowl is suspended in a horizontal position, is advantageous for evisceration in that it provides easy access to the interior of the fowl and is the position required by the U. S. D. A. Inspection Service for inspection of the fowl. Prior shackles do not provide suspending means for hanging the fowl in each of the three positions necessary for processing the fowl. Such shackles have necessitated the use of other means for proper positioning, or have required that the operator support the bird by hand in placing it in the horizontal position for evisceration and inspection. The additional operations of changing shackles or of supporting the bird by hand are undesirable since they are both time consuming and inconvenient.

Therefore, it is an object of this invention to provide a single shackle capable of suspending the fowl in the varied positions necessary for the proper processing thereof.

It is a further object of this invention to provide a shackle which is of simple, rigid construction with no movable parts. Thus, the shackle is easily constructed, will withstand rough handling without damage thereto, and requires only simple handling of the fowl by an operator to shift it to another position.

Additional objects, not set forth herein, will be apparent to one skilled in the art from the following detailed description.

In the drawings:

Figure 1 is a front view of one embodiment of the shackle, constructed in accordance with the invention;

Figure 2 is a side view of the shackle of Figure 1;

Figure 3 is a view taken on the line 3—3 of Figure 1; and

Figure 4 is a partial front view of a modification of the shackle shown in Figures 1–3.

Generally, the present invention comprises a suspending device having means for holding the legs of a fowl and additional means for holding its neck to suspend the fowl in different positions.

Referring particularly to Figures 1–3, the frame generally designated 10 comprises two side members 11; a transverse member 12 integral with and connecting the upper portions of said two side members; and inner members 13, 14, 15 integral with said side members and bent to form loops or points of support 16. Said inner members preferably have portions 13 thereof substantially parallel to said side members, middle portions 14 converging toward each other, and substantially parallel portions 15 extending above the transverse member 12 and terminating in a loop 17.

Secured to the inner members at points spaced upwardly from the loops 16 is a rigid cross member 20. V-shaped members 21 and 23 are rigidly attached at their ends to the converging portions 14 of the inner members, and the legs thereof are attached to the cross member 20 for bracing said members 21 and 23. The attachment of the ends of the cross member 20 to the portions 13 and of the ends of the V-shaped members 21 and 23 to the portions 14 reinforce the assembly in resisting a force applied to only one of the V-shaped members since the two V-shaped members and the cross member are rigidly interconnected as described above. The members 21 and 23 are preferably attached at adjacent points of the converging members 14 so that they may both be secured to the frame in one operation, e. g., by welding both members with one weld.

The apex or point of support 22 of the member 21 is positioned in substantially the same horizontal plane as the loops 16. The apex or point of support 24 of the member 23 is located a sufficient distance above the loops 16 and is located adjacent the member 20 to prevent interference by the member 20 in securing the neck of the fowl in the V-shaped member 23. The apex 24 and the cross member 20 are located a sufficient distance above the apex 22 to allow space for the insertion of the head of the fowl, when desired, in the lower position of the V-shaped member 21.

The loops 16 serve to hold the legs whereby the fowl may be suspended in a vertical position. The apices 22 and 24 serve as means to hold or support the neck while the legs of the fowl are held in the loops 16. The locations of the apices 22 and 24 relative to the loops 16 is important since the position of the fowl on the shackle is dependent on the three suspension points, an apex and the two loops. The position of the apex 22 provides a three-point suspension with the body of the fowl in substantially a horizontal position. The position of the apex 24 provides another three-point suspension with the body of the fowl inclined upwardly from rear to front, which suspension is substantially inverted to that when the fowl is suspended only by the legs.

The portions 14 and 15 of the inner members may be omitted if desired. The shackle may then be suspended by a separate loop or other means attached to the frame. Also, the V-shaped members 21 and 23 may be attached at their outer ends to the side members 11.

The modification shown in Figure 4 is similar in structure to that shown in Figures 1–3. Like numerals to designate like elements have been used. The modification shown in Figure 4 differs from the modification illustrated in Figures 1–3 in that the rigid cross member 20' is not attached to the portion 13 of the inner members but is affixed only to the legs of the V-shaped member 21 and to the apex 24 of the V-shaped member 23, thereby eliminating two attachments. Thus, the attachments of the ends of one V-shaped member to the portions 14 will effectively reinforce the attachments of the ends of the other V-shaped member since both V-shaped members are secured to the rigid cross member 20'. A portion of a force applied to only one V-shaped member will be transmitted through the rigid cross member 20' to the other V-shaped member.

In use, the shackle may be suspended by the loop 17 from a hook or the like attached to a conveyor. The fowl is suspended from the shackle in an inverted position by inserting the feet through the upper part of the frame between the side members 11 and the portions 15 of the inner members and then sliding the legs into the loops 16. By looping the neck of the fowl through either of the V-shaped members 21 and 23 the fowl may be suspended in either a horizontal or an inverted position. Although not limited in use to continuous line processing, the shackle is especially useful therein since one shackle serves to support the bird in all of the positions necessary from beginning to end of the processing operations. It requires only a simple, quick operation by persons on the processing line to change the position of the fowl on the shackle for the next operation.

Obviously many modifications and variations of the invention as hereinbefore set forth may be made without departing from the spirit and scope thereof, and therefore only such limitations should be imposed as are indicated in the appended claims.

I claim:

1. A shackle for suspending fowl comprising: an open, rectangular frame having a member on three sides, the lower, open side of said frame having the opposite side members looped back upon themselves to form leg-holding supports and extending to form inner members, a portion of each inner member extending parallel with and spaced from said side members; a V-shaped head-holding member attached at its ends to said inner members, the legs of said V-shaped member converging to an apex located substantially centrally of and coextensive with the lower end of said frame; and a reinforcing cross member attached to said V-shaped member substantially midway along the length of said V-shaped member.

2. A shackle for suspending fowl comprising: an open rectangular frame having a member on three sides, the lower, open side of said frame having the opposite side members looped back upon themselves to form leg-holding supports and extending to form inner members, a portion of each inner member extending parallel with and spaced from said side members; a first V-shaped head-holding member attached at its ends to said inner members, the legs of said first V-shaped member converging to an apex located substantially centrally of and coextensive with the lower end of said frame; a reinforcing cross member attached to said V-shaped member substantially midway along the length of said V-shaped member; and a second V-shaped head-holding member attached at its ends to said inner members at points adjacent the ends of said first V-shaped member and attached at its apex to said reinforcing cross member.

References Cited in the file of this patent

UNITED STATES PATENTS

| | | |
|---|---|---|
| 938,765 | Henig | Nov. 2, 1909 |
| 2,405,638 | Bilek | Aug. 13, 1946 |
| 2,613,390 | Wayne | Oct. 14, 1952 |
| 2,639,463 | Zebarth | May 26, 1953 |